(12) United States Patent
Tanner et al.

(10) Patent No.: US 10,247,310 B2
(45) Date of Patent: Apr. 2, 2019

(54) SELF-RETAINING, EASILY REMOVABLE PNEUMATIC SEAL

(71) Applicants: Douglas E. Tanner, Copake, NY (US); Patrick Flynn, Danbury, CT (US)

(72) Inventors: Douglas E. Tanner, Copake, NY (US); Patrick Flynn, Danbury, CT (US)

(73) Assignee: Pawling Engineered Products Inc., Pawling, NY (US)

( * ) Notice: Subject to any disclaimer, the term of this patent is extended or adjusted under 35 U.S.C. 154(b) by 0 days.

(21) Appl. No.: 15/695,556

(22) Filed: Sep. 5, 2017

(65) Prior Publication Data

US 2018/0080564 A1    Mar. 22, 2018

Related U.S. Application Data

(60) Provisional application No. 62/398,222, filed on Sep. 22, 2016.

(51) Int. Cl.
| | |
|---|---|
| *F16J 15/40* | (2006.01) |
| *F16J 15/46* | (2006.01) |
| *F16J 15/02* | (2006.01) |
| *F16J 15/06* | (2006.01) |

(52) U.S. Cl.
CPC ............. *F16J 15/46* (2013.01); *F16J 15/027* (2013.01); *F16J 15/061* (2013.01)

(58) Field of Classification Search
CPC .. F16J 15/46; F16J 15/48; F16J 15/027; F16J 15/061
See application file for complete search history.

(56) References Cited

U.S. PATENT DOCUMENTS

| | | | |
|---|---|---|---|
| 2,156,681 A | 5/1939 | Dewhirst et al. | |
| 2,622,286 A | 12/1952 | Beck | |
| 2,952,053 A | 9/1960 | Frehse | |
| 3,578,342 A * | 5/1971 | Satterthwaite | B63H 23/321 277/511 |
| 4,115,968 A | 9/1978 | Majumdar | |
| 4,534,569 A * | 8/1985 | Ishitani | B63H 23/321 277/351 |

(Continued)

FOREIGN PATENT DOCUMENTS

| | | |
|---|---|---|
| EP | 0201223 A1 | 11/1986 |
| GB | 1585974 A | 3/1981 |

*Primary Examiner* — Gilbert Y Lee
(74) *Attorney, Agent, or Firm* — St. Onge Steward Johnston & Reens, LLC

(57) ABSTRACT

A self-retaining, recessed seal for reception in an open top groove, where the groove is neither configured for seal retention (e.g., convergent side walls), nor provided with seal retention features such as flanges, projections, etc. No adhesives are required, enabling the seal to be easily removed for cleaning, etc. The self-retaining seal has a bottom structure with lateral extensions, wider than the groove, with upwardly angled surfaces at the edges and portions that extend upward when compressed laterally by the walls of the groove. Side walls of the seal extend upward from the bottom structure and are slightly narrower than the groove, to avoid or minimize contact with the groove side walls when the seal is inflated. The configuration enables relatively easy installation of the seal but effectively prevents the seal from "walking" out of the groove over time, with repeated cycles of inflation and deflation.

18 Claims, 7 Drawing Sheets

(56) References Cited

U.S. PATENT DOCUMENTS

| | | | |
|---|---|---|---|
| 4,724,113 A * | 2/1988 | Lee | B01D 63/021 |
| | | | 210/500.23 |
| 4,861,043 A * | 8/1989 | Anderson | E02B 3/16 |
| | | | 277/312 |
| 5,007,202 A | 4/1991 | Guillon | |
| 8,225,553 B1 | 7/2012 | Redfern et al. | |
| 2002/0113377 A1 | 8/2002 | Mann | |
| 2008/0190055 A1* | 8/2008 | Schmid | E04B 1/6807 |
| | | | 52/259 |

* cited by examiner

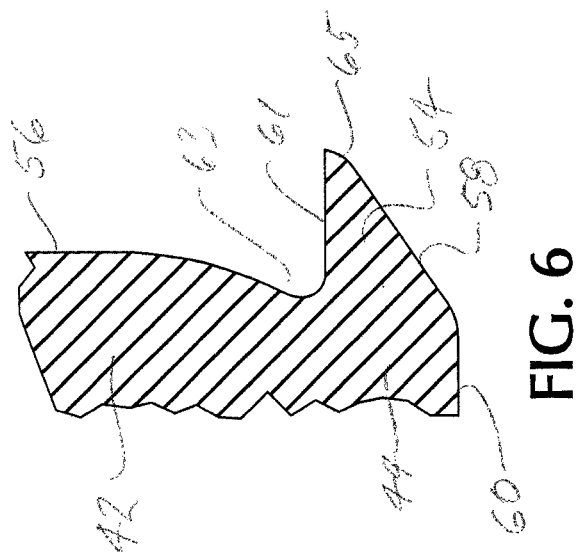
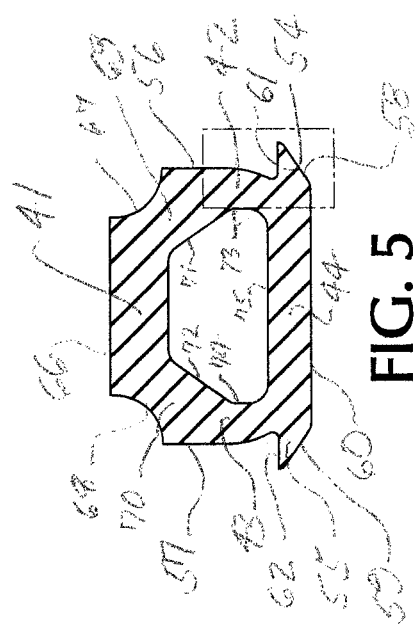
FIG. 6
FIG. 5

SELF-RETAINING, EASILY REMOVABLE PNEUMATIC SEAL

FIELD OF THE INVENTION

The invention relates to pneumatically inflatable seals and more particularly to an improved form of pneumatically inflatable that is self-retaining in an open face groove, without adhesives or mechanical retention elements, and is easily removable for cleaning or other servicing.

BACKGROUND OF THE INVENTION

Pneumatically inflatable seals, which come in many different designs, are widely used for effecting a seal between two surfaces. In a typical application one member, for example a door or cover, may be movable between open and closed positions relative to a second member. An inflatable seal, mounted in one of the members, is normally spaced from the other member to accommodate opening and closing but is inflated and expanded after closing in order to close and seal the space between the two members. In one widely used form of pneumatically inflatable seal, sometimes referred to herein as a recessed seal, an elongated elastomeric sealing element is received within a retaining groove provided in one of the members. When deflated, the sealing element typically is wholly contained within the groove. Typically the space between the two members to be sealed is relatively small, and inflation of the sealing element causes it to expand and extend an outer surface portion out of the retaining groove to make contact with the opposite member and form the desired seal.

With known forms of recessed seals, it is customary to provide retention means for retaining the seal in its groove. Such retention means can be provided in the configuration of the groove, for example with retention elements, flanges or the like, or by means of adhesives. Both arrangements have disadvantages. Configuring the groove with retention means involves extra machining, while the use of adhesives involves additional labor. Moreover, for many sealing applications involving recessed seals, periodic cleaning is necessary or desirable, which can be difficult and expensive with conventional forms of recessed seals utilizing conventional retention means. While it has been attempted to utilize seal and groove designs in which the groove is straight sided and the seal is retained by friction with the side walls, the experience has not been satisfactory. The seals, with repeated expansion and deflation cycles over time, tend to "walk" toward the open top of the groove and in time become improperly positioned, resulting in an improper or ineffective sealing and also possibly subjecting the seal to damage during opening and closing of the mechanism to be sealed.

SUMMARY OF THE INVENTION

In accordance with the invention, a pneumatically inflatable recessed seal is provided which is self-retaining in its groove, without the use of adhesives and without requiring the groove to be configured with flanges, converging side walls or the like. In the recessed seal arrangement of the invention the groove can have straight, parallel side walls, and the necessary retention means is incorporated into a novel design of the inflatable sealing element. The inflatable sealing element is provided with a base, which is positioned at the bottom of the groove. The base has a normal width slightly greater than that of the groove, forming flange-like lateral extensions at the bottom of the seal. These flange-like extensions of the base are compressed laterally when the sealing element is inserted into the groove. The sealing element has side walls that are normally (i.e., in a deflated condition of the seal) generally parallel to and spaced a distance inward from the side walls of the groove. The geometry of the seal, its groove and its required extension to form a seal, are such that, when the seal is pressurized and extended into sealing contact with the opposite member, the side walls of the seal have little if any contact with the side walls of the groove. The arrangement is such that there is substantially no tendency for the seal to incrementally "walk" outwardly in its groove and become improperly positioned, even over many operating cycles of inflation and deflation of the seal. At the same time, the seal can easily be removed and replaced for periodic cleaning and servicing.

In one preferred embodiment of the invention, the flange-like extensions of the seal base are tapered from the bottom upward toward the upper surface of the extensions. This facilitates initial insertion of the seal into its groove and also results in an upward deflection of upper-outer corner portions of the flange-like projections to minimize upward bowing of the bottom wall as a whole. The upwardly deflected corner portions provide optimum resistance to any upward movement of the seal bottom within the groove and thus securely retain the seal in its installed position in the groove.

In another preferred embodiment of the invention, flexible retention lobes extend upward from lateral extremities of the seal base, alongside lower portions of the side walls of the sealing element. The seal base, as in the above embodiment, is somewhat wider than the space between side walls of the groove and is tapered upwardly and outwardly at each side. Laterally outer portions of the retention lobes are also normally slightly wider than the groove and are compressed tightly against the lower side walls of the seal when it is inserted into the groove. The retention lobes, while easily compressed inward during insertion of the seal into the groove, tend to deform outwardly and grab the side walls of the groove to resist movement of the seal in an opposite direction, out of its retaining groove. The unique configuration of the sealing element of the invention makes it reliably self-retaining in its groove, without adhesives and/or special configuring of the groove.

For a more complete understanding of the above and other features and advantages of the invention, reference should be made to the following detailed description of the invention and to the accompanying drawings.

BRIEF DESCRIPTION OF THE DRAWINGS

FIG. 5 is a cross sectional view of the sealing element embodiment of FIG. 4, shown prior to its installation in a grooved member and in a deflated condition.

FIG. 6 is an enlarged, fragmentary cross sectional view of the seal of FIG. 4 showing details of the portion thereof outlined in dashed lines.

DETAILED DESCRIPTION OF THE INVENTION

Figure 1:
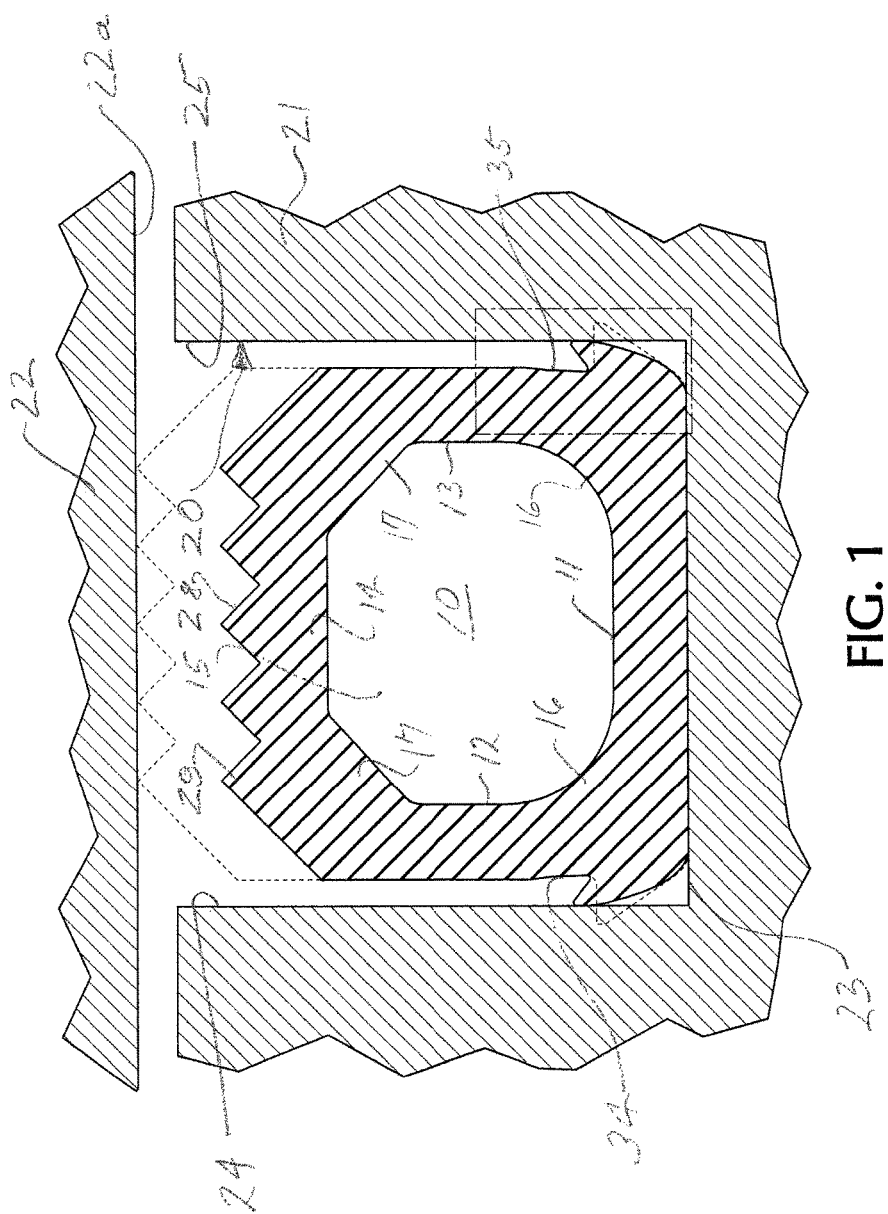
FIG. 1. is a cross sectional view of one advantageous form of self-retaining, recessed sealing element incorporating principles of the invention, shown seated in a grooved member, with the seal in an uninflated condition.
Figure 3:
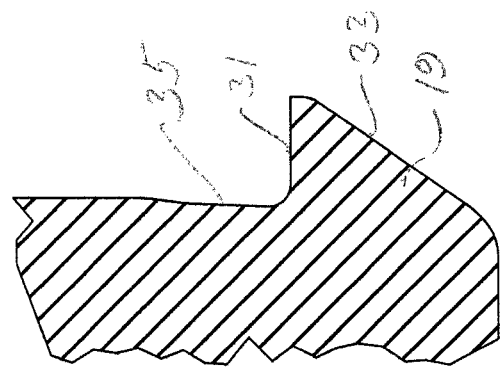
FIG. 3 is an enlarged, fragmentary cross sectional view of the seal of FIG. 2 showing details of the portion thereof outlined in dashed lines.
Figure 2:
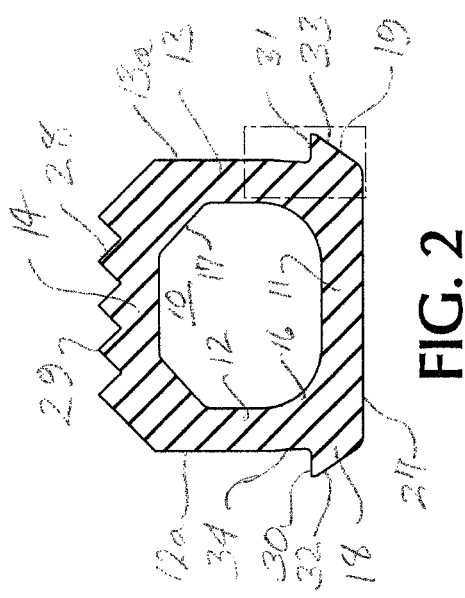
FIG. 2 is a cross sectional view of the sealing element of FIG. 1, shown prior to installation in a grooved member and in a deflated condition.

Referring to the drawings, the reference numeral 10 designates generally a sealing element according to the invention of a typical but non-limiting configuration. The sealing element 10 is formed of a suitable elastomeric material, such as EPDM, neoprene or silicone rubber, and can be molded or extruded to suitable lengths. The elements 10 may be formed into various configurations, such an annular (inwardly or outwardly expanding), circular, straight, rectangular, etc. The sealing element 10, illustrated in FIGS. 1-3, is formed with a flat base 11, laterally spaced apart side walls 12, 13 and a top wall 14, forming a hollow interior 15. The base 11 preferably is relatively thick and stiff. In a non-limiting but exemplary embodiment, where the seal may have a height (uninflated) of about 14.0 mm (±0.8 mm) and a width of about 15.2 mm (+0.0 mm, −1.0 mm), the base 11 may have a thickness of about 2.2 mm and side walls 12, 13 of similar thickness. The side walls and bottom preferably are joined with generous fillets 16 of, for example, a radius of about 3.2 mm.

The side walls 12, 13 of the illustrated sealing element extend straight up, in substantially parallel relation. The outer surfaces 12a, 13a of the side walls likewise are preferably straight and parallel. At their upper ends, the side walls 12, 13 are joined with the top wall 14, which preferably is of a similar or slightly greater thickness than the side walls 12, 13 and is joined to the side walls by relatively thick transitional portions 17 extending upward and inward at an angle of about 45°.

In accordance with the invention, the base 11 has flange-like laterally extending portions 18, 19 at each side that project laterally outward from the side wall outer surfaces 12a, 13a, as shown best in FIGS. 2 and 3. As a significant aspect of the invention the flange-like portions 18, 19 have an overall width that is somewhat greater than the width of the groove 20 in which the seal is seated. In the illustrated structure, the groove 20 is formed in one member 21 of a two member assembly 21-22 to be sealed. One of the two members 21, 22 typically is moveable relative to the other between open and closed positions. FIG. 1 illustrates the members in a closed position, in which a movable member 22 is positioned in close proximity to, but not necessarily in contact with, a fixed member 21. In an exemplary structure, the spacing between the fixed and movable members 21, 22, in their closed positions, may be about 3.0 mm.

In the embodiment of the invention illustrated in FIGS. 1-3, the groove 20 provided in the fixed member 21 is of rectangular configuration with a flat bottom wall 23 and straight, parallel side walls 24, 25. The groove 20 is slightly deeper than the relaxed height of the seal, such that the top wall of the relaxed seal lies a short distance below the top surface 26 of the grooved member 21. In a representative but non-limiting example of the embodiment of FIGS. 1-3, the groove 20 has a width of about 17.0 mm (+0.5 mm, −0.0 mm), and a height of about 14.8 mm (+0.25 nn, −0.0 mm). The illustrated seal 10, in a relaxed (i.e., unpressurized) condition, has an overall height between its bottom and top surfaces 27, 28 of about 14.0 mm (±0.8 mm). The bottom surface 27 is flat and seats against the bottom wall 23 of the groove. The upper surface is formed with a plurality of longitudinally extending, pointed ridges 29 of generally triangular section. When the seal is inflated, as shown in dotted lines in FIG. 1, the top wall of the seal is elevated to bring the ridges 29 into contact with the bottom surface 30 of the movable member 22 to form the desired seal along multiple lines.

In accordance with one aspect of the invention, the seal 10 has a base structure which includes its bottom wall 11 and the flange-like lateral extensions 18, 19. The overall width of the base structure is greater than the width of the groove 20 between its side walls 12, 13, whereby the base of the seal has to be forcibly pressed into the groove 20 in such manner that the opposite sides of the extensions 18, 19 are in tight frictional engagement with the side walls 12, 13. In a representative but non-limiting embodiment of the invention, the relaxed width of the seal base, between opposite extremities of the lateral extensions 18, 19, may be about 17.9 mm (+0.8 mm, −0.0 mm), for reception in the groove 20 having a width of about 17.0 mm (+0.5 mm, −0.0 mm). The vertical height of the lateral extensions may be slightly greater than the thickness of the bottom wall 11. For example, in a seal with a bottom wall thickness of about 2.2 mm, the lateral extensions may have an overall height of about 2.7 mm.

To advantage, the lateral extensions 18, 19 have a generally triangular configuration, with flat, horizontal upper surfaces 30, 31, and upwardly and outwardly angled end surfaces 32, 33 (FIGS. 2, 3). The end surfaces 32, 33 preferably start from a location at least somewhat inside the outer surfaces of the respective side walls 12, 13 and may be disposed at an angle of about 55° to the horizontal. When the seal 10 in pressed into the groove 20, the lateral extensions 18, 19 are compressed and deflected inward and upward, as is indicated in FIG. 1, with upper portions of the angled surfaces 32, 33 in snug frictional contact with the side walls 24, 25 of the groove. The upwardly deflected orientation of the lateral extensions, when the seal is fully seated in the groove, strongly resist any movement of the seal out of the groove, because the frictional grip of the extensions on the groove side walls will tend to rotate the extensions outwardly and further increase their grip, if the body of the seal is displaced toward the open side of the groove.

It is contemplated that an optimum ratio of width of the groove 20 to that of the lateral extensions 18, 19 is for the groove width to be approximately 94% of the relaxed width of the lateral extensions, with an acceptable working range of about 89% to 96%. Stated another way, the width of the lateral extensions 18, 19 preferably is in a range of from about 104% to about 112% of the width of the groove 20.

The side walls 12, 13 of the seal 10 may be recessed slightly on their exterior surfaces, immediately above the top surfaces 30, 31 of the lateral extensions 18, 19, as shown at 34, 35, to better accommodate the desired upward and inward deflection of the extensions 18, 19 when the seal 10 is installed in its groove 20.

Pursuant to the invention, the width of the seal 10, above the lateral extensions 18, 19 is narrower than the width of the groove 20, such that the outer surfaces of the seal side walls 12, 13 are spaced inward a distance from the groove side walls 24, 25. In a representative embodiment of the invention, the side walls 12, 13 are disposed in substantially parallel relation, with each other and with respect to the side walls 24, 25 of the groove. In a non-limiting example, the relaxed width of the seal, between outer surfaces of its side walls, may be about 15.2 mm (+0.0 mm, −1.0 mm), while the width of the groove 20 may be about 17.0 mm (+0.5 mm, −0.0 mm). This provides a working range of seal width to groove width of approximately 80% to approximately 90%. While it is possible to operate with ratios lower than the indicated acceptable working range, there are undesirable trade-offs from doing so, in the form of reduction in the degree of vertical extension of the seal, higher inflation pressure requirements, and shorter seal life.

When the seal of FIGS. 1-3 is inflated, it expands primarily in a vertical direction, because the generous fillets 16 at the bottom corners and thick transition sections 17 extending between the top and side walls tend to limit outward bowing of the side walls 12, 13. The spacing between the side walls of the grooves and the side walls of the seal is such that there is relatively minimal, if any, contact between them when the seal is inflated to its typical pressures of, for example, 40-80 psi, usually at least 50 psi. Accordingly, there is little if any tendency for the seal to "walk" during repeated inflation and deflation cycles, and any such tendency is more than adequately controlled by the advantageously configured, flange-like structure at the bottom of the seal. Nevertheless, if there is a need to remove the seal, for periodic cleaning or replacement, it can easily be done because there are no adhesives involved and it is not necessary to deal with special structural configurations of the groove provided for retention of the seal.

Figure 4:
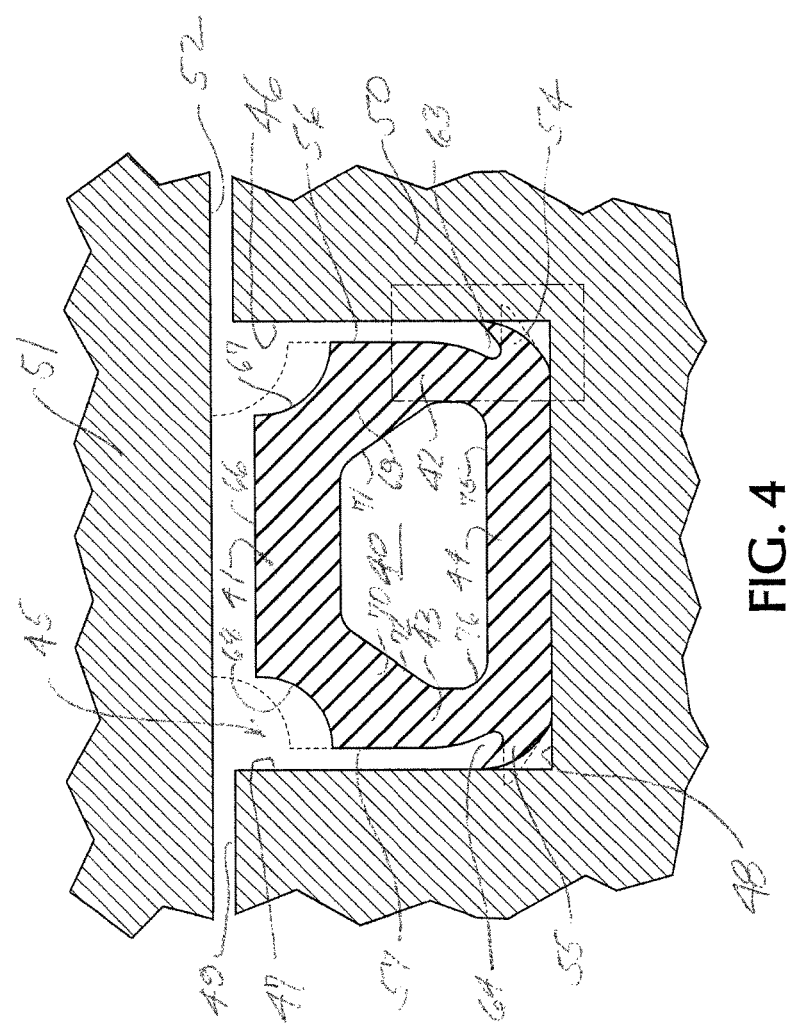
FIG. 4 is a cross sectional view of a second advantageous form of self-retaining, recessed sealing element incorporating principles of the invention, shown seated in a grooved member, with the seal in an uninflated condition.

FIGS. 4-6 of the drawing illustrate a second embodiment of the invention, incorporating principles of operation similar to the first described embodiment of FIGS. 1-3 but having certain modifications in its features. An inflatable seal 40 is comprised of a top wall 41, opposite side walls 42, 43 and a bottom wall 44. The seal, formed of a suitable elastomeric material as heretofore mentioned, is configured to be seated in a groove 45 defined by spaced apart, parallel side walls 46, 47 and a bottom wall 48 disposed at right angles to and connecting the two side walls. The top wall 41 of the seal is flat and, in the relaxed condition of the seal, is recessed slightly below the top surface 49 of a first member 50, in which the groove 45 is formed and which forms one part of a two-part assembly to be sealed. A second member 51 forms the second part of the two-part assembly and has a surface 52 which can be positioned a short distance away from the surface 49 of the first member 50. The two parts 50, 51 are shown is a "closed" configuration in FIG. 4, and it will be understood that at least one of the parts 50 or 51 is typically, but not necessarily, movable relative to the other to an "open" configuration. When the parts 50, 51 are in a closed configuration, the seal 40 can be pressurized and expanded vertically to bring its top surface 41 into sealing contact with the surface 52 of the member 51.

In accordance with the invention the seal 40 is formed with flange-like lateral extensions 54, 55 projecting from each side of its bottom wall 44. The overall width of the extensions 54, 55 is greater than the width of the groove 45 between its opposing side walls 46, 47. In a representative but non-limiting example, the seal 40 may have an overall width at its lateral extensions 54, 55 of about 16.2 mm (+0.64 mm-0.0 mm), for reception in a groove 45 having a width of about 15.0 mm (+0.5 mm, −0.0 mm). A target ratio of groove width to extension width is about 94%, although a suitable operational range may be about 89% to 96%, corresponding to an extension-to-groove width ratio of from about 104% to about 112%. Additionally, the outer surfaces 56, 57 of the respective seal side walls 42, 43 are of a width less than the width between the groove side walls 46, 47, to provide a predetermined clearance space, which is evident in FIG. 4. In the illustrated, representative but non-limiting example, the width of the seal 40 between outer surfaces 56, 57 of its side walls is approximately 13.7 mm (+0.0 mm, −0.9 mm). Accordingly, the clearance space between the groove side walls and the seal side walls typically will fall in the range of about 1.3 mm to about 2.7 mm, corresponding to a desired percentage range of seal wall width to groove width of approximately 80% to 90%. As with the seal of FIGS. 1-3, narrower seal width to groove width ratios could be operable to some degree, but with undesirable trade-offs in the form of less functionality and shorter product life.

According to an aspect of the invention, the bottom surfaces 58, 59 of the lateral extensions 54, 55 are disposed at an upward and outward angle from the bottom wall surface 60, joining with flat, generally horizontal top surfaces 61, 62 of the extensions. In the illustrated example, the angled surfaces 58, 59 may start from a point inside of the side wall surfaces 56, 57 and may be disposed at an angle of about 35° with respect to the bottom wall surface 60, such that the lateral extensions have a generally triangular cross section, tapering to relatively pointed end extremities. The end extremities preferably rounded slightly underneath, as indicated at 65 in FIG. 6. Additionally, the side walls 42, 43 of the seal preferably are recessed in regions 63, 64 directly above the lateral extensions. In the representative embodiment of FIGS. 4-6, the recesses 63, 64 may extend inward about 0.6 mm from the outer surfaces of the side walls 56, 57. This extends the effective length of the lateral extensions and imparts greater flexibility thereto, facilitating insertion of the seal into its groove 45.

As shown in FIG. 4, when the seal 40 is installed in the groove 45, the respective flange-like extensions 54, 55 are flexed upward and inward toward the side walls 56, 57. This provides a highly effective grip against the groove side walls 46, 47 to strongly resist any tendency for the seal to self-walk out of the groove during repeated inflation and deflation cycles. Any tendency for the seal to move upward in the groove will result in the flexed extensions 54, 54 being urged downward and outward with respect to the body of the seal, increasing the grip of the extensions on the groove side walls.

The form of the seal shown in FIGS. 4-7 is somewhat shorter in height in relation to its width, as compare to the embodiment of FIGS. 1-3. Thus, the overall height of the seal 40 may be about 10 mm (±0.8 mm), with a width (above the lateral extensions 54, 55) of about 13.7 mm (+0.0 mm, −0.9 mm). The seal 40 is also designed to have a somewhat smaller vertical travel of about 3.0 mm as compared to about 3.5 mm for the seal 10 of FIGS. 1-3. The upper surface 66 of the top wall 41 is flat and adapted to contact a flat lower surface 52 of the member 51. The side edges 67, 68 of the top wall 41 are curved on a radius of about 1.3 mm such that the upper surface 66 is considerably narrower than the space between the outer side wall surfaces 56, 57. In the illustrated embodiment, the top wall 41 is relatively thick (e.g., 2.6 mm (±0.4 mm) and is connected to the side walls 42, 43 by relatively thick transition sections 69, 70 having inner walls 71, 72 extending at a downward and outward angle of about 55° from horizontal. The walls 71, 72 join short vertical side walls 73, 74 which in turn are joined with a bottom wall 75 by generously rounded fillets 76. The overall configuration of the seal is such that, when inflated, its expansion is largely vertical, as indicated by broken lines in FIG. 4.

Figure 7:
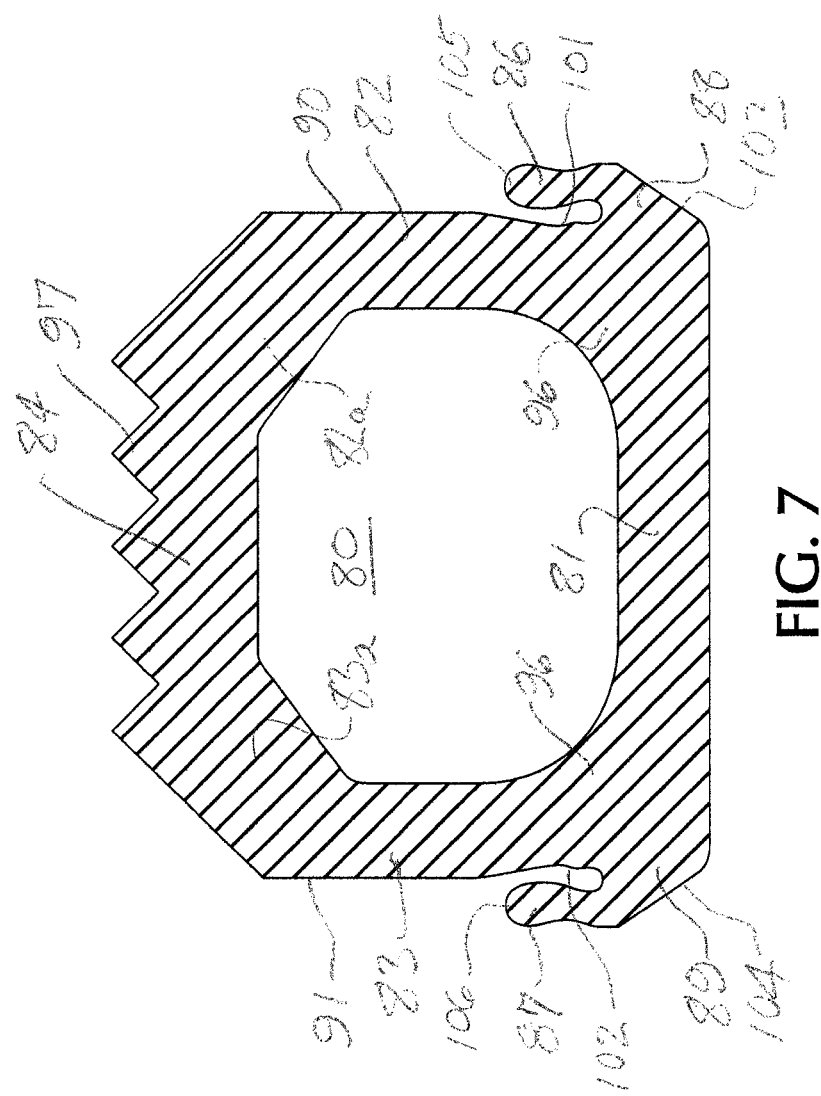
FIG. 7 is a cross sectional view of yet another embodiment of self-retaining recessed sealing element incorporating principles of the invention.
Figure 8:
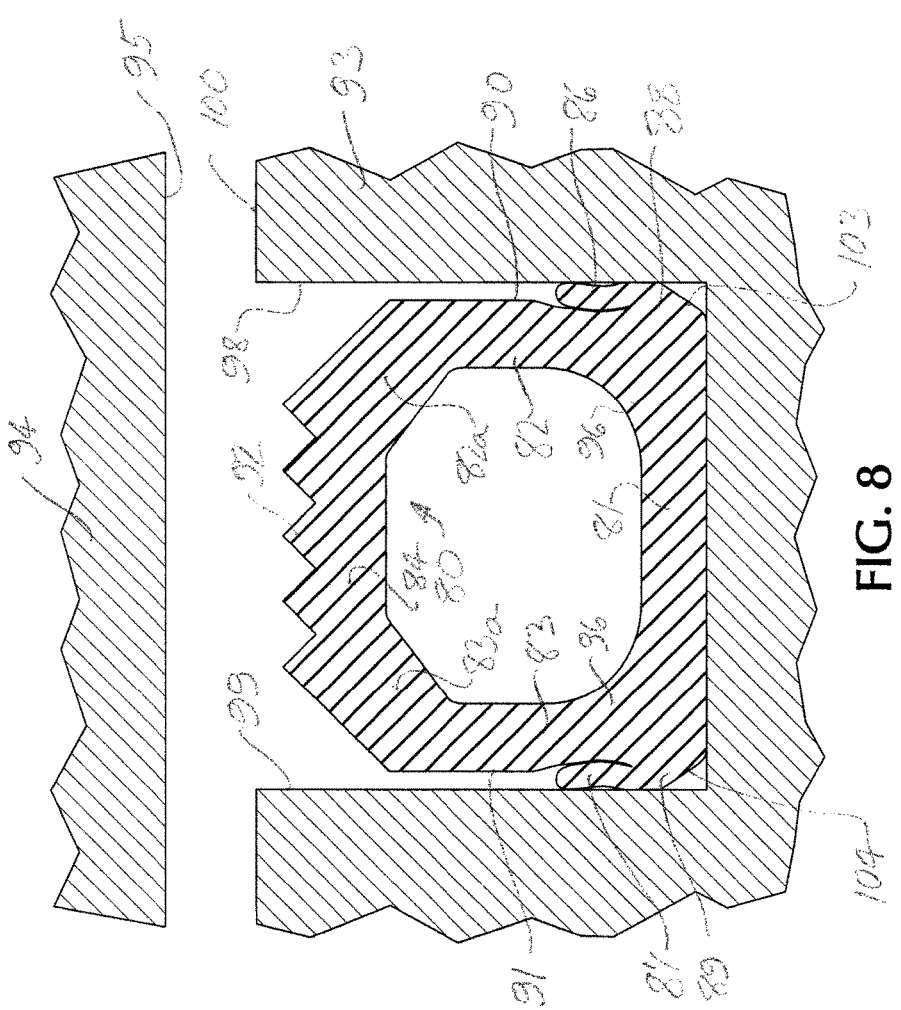
FIG. 8 is a cross sectional view of the sealing element of FIG. 7, shown as installed in a grooved member and in a deflated condition.
Figure 9:
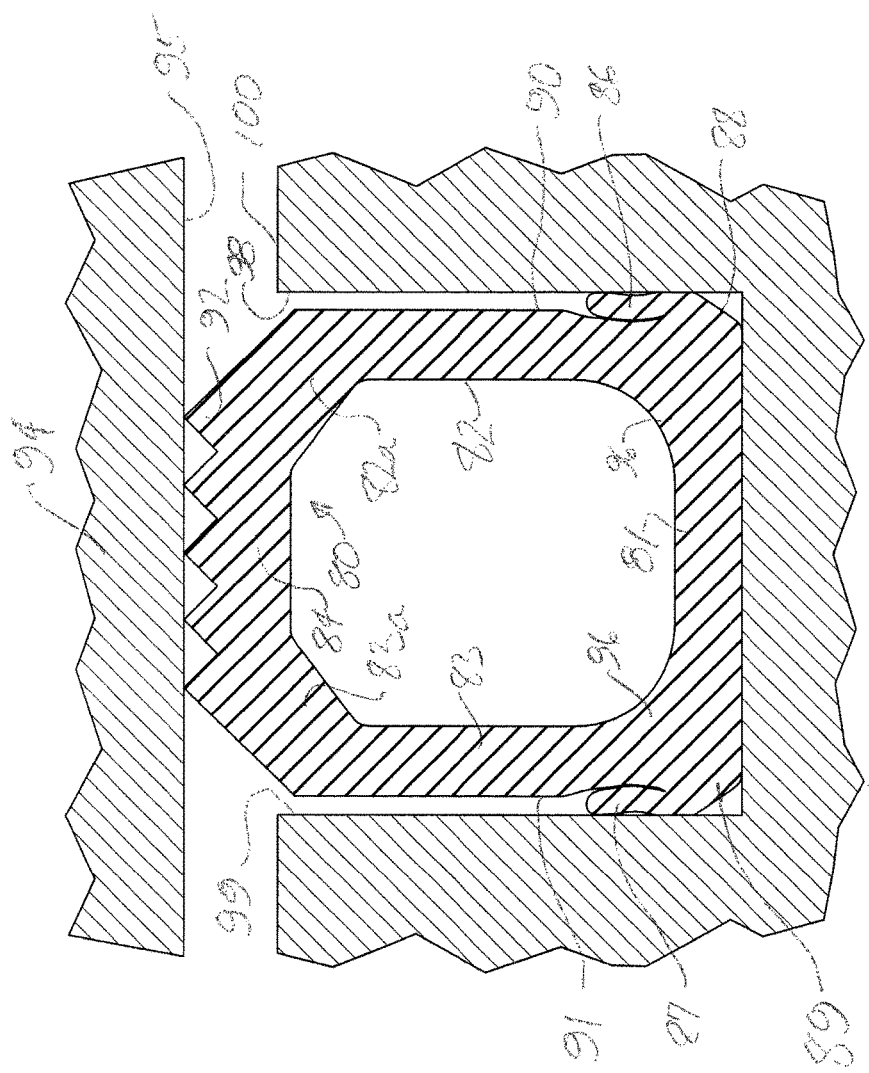
FIG. 9 is a cross sectional view, similar to FIG. 8, with the sealing element shown in an inflated condition, in sealing contact with a second member.

In a further embodiment of the invention, shown in FIGS. 7-9, a seal having a general configuration similar to that of FIGS. 1-3, is provided with additional retention means, extending upward from flange-like lateral extensions, to facilitate gripping of groove side walls by the sealing element. The illustrated sealing element 80 is formed with a flat bottom wall 81, laterally spaced apart side walls 82, 83 and a top wall 84, forming a hollow interior 85. The bottom wall 81 preferably has a central portion which is relatively thick and stiff. In a non-limiting but exemplary embodiment, the bottom wall 81 may have a thickness of about 1.9 mm and side walls 82, 83 of similar thickness, with the side walls and bottom wall being joined with generous fillets 96. Retention lobes 86, 87, to be described more fully, are joined to flange-like lateral extensions 88, 89 of the bottom wall, preferably in the upper, outer portions of the extensions.

The side walls 82, 83 of the illustrated sealing element extend straight up, in substantially parallel relation, with outer surfaces 90, 91 of the side walls likewise being preferably straight and parallel. At their upper ends, the side walls 82, 83 are joined with the top wall 84, which preferably is of a similar or slightly greater thickness than the side walls 82, 83.

As shown in FIGS. 8 and 9, the sealing element 80 is received in a groove or recess 92 provided in one of the members 93 to be sealed. An opposing member 94 is spaced a short distance away from the first member 93 and its surface 95 is positioned to be contacted by the top wall 84 when the sealing element is expanded, as reflected in FIG. 9. In the illustrated device, the top wall 84 is provided with a plurality of longitudinally extending surface ridges 97 which engage the surface 95 and provide a desired sealing contact when the sealing element is under pressure. It will of course be understood that all embodiments of the sealing elements described herein are provided with necessary connections and valving (not shown) for controllably inflating and deflating the elements as desired.

In accordance with an aspect of the invention the opposing side walls 98, 99 of the groove 92 preferably are straight and parallel, and they are spaced apart a distance slightly less than the width of the lateral extensions 88, 89 of the bottom wall 11 and somewhat more than the space between the outer side wall surfaces 90, 91 of the seal. In a representative but non-limiting example, the width of the lateral extensions 88, 89, may be approximately 18.2 mm±0.13 mm while the space between the side walls 98, 99 of the groove may be approximately 17.0 mm±0.13 mm. The width of the upper portion of the seal 10, between its outer side wall surfaces 90, 91, when the sealing element is not under pressure, may be 15.5 mm±0.25 mm, providing a nominal spacing of about 0.75 mm at each side. The depth of the groove 92 is such that the ridges 97 on the top wall 84 lie just below the top surface 100 of the grooved member 93, as shown in FIG. 8, when the seal is not under pressure. Recessed seals of the type described herein are intended to have a relatively small expansive movement of the top wall 84, when pressurized. In the illustrated device, the bottom surface 95 of the movable member 94 is spaced approximately 3.0 mm above the top surface 100 of the grooved member, such that vertical extension of the sealing element under pressure, as shown in FIG. 9, need be only a small amount greater than the 3.0 mm spacing between the members 93, 94.

In the exemplary form of the invention illustrated in FIGS. 7-9, the sealing element 80 may have an overall height, when not pressurized, of 13.5 mm±0.76 mm. The hollow interior may have a height of 7.90 mm±0.64 mm. The upper corners 82a, 83a of the seal are relatively thicker than the side walls and extend at an angle in connecting the tops of the side walls 82, 83 to the opposite side edges of the top wall 84.

Because of the relative stiffness of the cross sectional configuration of the sealing element, there is minimal outward bowing of the side walls 82, 83 when the seal is inflated and under pressure. Accordingly, because of their initial spacing from the side walls 98, 99 of the groove, the side walls 90, 91 of the pressurized sealing element preferably will not make any contact with the side walls 98, 99 of the groove. However, if the side wall surfaces of the seal do make contact with the side walls of the groove, any such contact is insufficient to cause the sealing element to grip the side walls of the groove with any significant force. The sealing element remains firmly engaged with the groove walls by the lateral extensions 88, 89 of the base and by the compressed retention lobes 86, 87.

In the form of the invention illustrated in FIGS. 7-9, the bottom corners 103, 104 of the lateral extensions 88, 89 start from a location slightly inside of the side wall outer surfaces 90, 91 and are disposed at an angle of, for example, 55° to the bottom wall 81. This facilitates the initial insertion of the sealing element into the groove 22 and causes outer portions of the extensions to be displaced upward and inward toward the side walls 90, 91 of the seal. As reflected in FIG. 7, the retention lobes 86, 87 are positioned wholly or largely laterally outward of the sealing element side walls 82, 83, and their overall thickness is such that, when the sealing element is inserted in the groove 92, the retention lobes are compressed tightly against the side walls 82, 83 (FIGS. 8, 9). To advantage, the lower portions of the side walls 82, 83 may be recessed slightly at 101, 102 to receive portions of the retention lobes when the sealing element is installed in the groove 92.

As indicated in FIG. 7, the retention lobes 86, 87 extend generally vertically upward and have somewhat of an outwardly concave cross sectional configuration. The lobes, which extend continuously along the sides of the seal 80, may have a height of approximately 2 mm and thickness at the base of approximately 0.6 mm. Prior to installation of the seal 80 in the groove 92, the retention lobes are spaced slightly outward from the locally recessed areas 101, 102 of the side walls as is evident in FIG. 7. In the illustrated embodiment of the invention, the lobes 86, 87 are formed with bulbous enlargements 105, 106 at their upper extremities. Prior to insertion of the seal into the groove 92 the overall width of the retention lobes, in the area of the bulbous enlargements 105, 106, can be approximately 10% greater than the width of the groove. Since the retention lobes are directed vertically upward, in the orientation shown in the drawings, they provide only modest resistance to insertion of the seal 80 into the groove. The extensions 88, 89 and lobes 86, 87 compress laterally as necessary to be received between the groove side walls 98, 99. However, when force is applied to the seal in the opposite (removal) direction, the inwardly compressed extensions and retention lobes tightly grip the side walls and any tendency of movement of the seal out of the groove causes the lobes 86, 87 is compress vertically and expand laterally outward, greatly increasing the resistance to removal. The seal is thus effectively self-retaining against normal forces acting thereon and can be reliably installed without adhesives and/or special retention means installed in or configured into the groove. At the same time, the seal, when deflated, can be intentionally removed without difficulty, when desired for cleaning, replacement, etc.

The various sealing arrangements according to the invention are characterized by a combination of seal and groove configurations in which side walls of uninflated seals are spaced a short distance inward from the side walls of the groove, and the seal is provided with a unique bottom structure including lateral extensions that are wider than the groove and configured for easy installation and uniquely simple and advantageous self-retention of the seal within a groove formed with non-convergent side walls and which is otherwise free of special seal-retention elements or configurations. In general a side wall width to groove width for the seals preferably are within a range of about 80% to about 90%, while the groove width to bottom extension width preferably are within a range of about 89% to about 96%.

It is to be noted that references herein to directions, such as vertical, horizontal, upward, top, bottom, etc., unless otherwise indicated, are referenced only to the device as oriented in the accompanying drawings and are not intended to be in any way limiting on the scope of the invention. In actual practice the seals of the invention may be oriented in any manner dictated by the device or mechanism required to be sealed.

It will be understood that the specific forms of the invention herein illustrated and described are intended to be representative only and not limiting of the invention. Accordingly, reference should be made to the following claims in determining the full and proper scope of the invention.

What is claimed is:

1. A sealable structure, with a self-retaining inflatable seal configured and constructed for repetitive cycles of inflation and deflation and periodic removal and replacement for servicing, which comprises
   a first sealable member formed with an outer surface and a seal-receiving groove open at said outer surface,
   said groove having a predetermined depth from said outer surface and a predetermined width and having substantially parallel side walls,
   a second sealable member having a sealing surface positionable in opposed, closely spaced relation to the outer surface of said first sealable member, and
   a self-retaining, fluid-inflatable seal removably received in said groove, said seal having bottom and top walls and spaced apart side walls connecting said bottom and top walls,
   said side walls extending upward with outer surfaces thereof in parallel relation to the side walls of said groove,
   said seal, when unpressurized, having a width between outer surfaces of its side walls, which is about 80% to about 90% of the width of said groove,
   said seal, when unpressurized, having a height no greater than the depth of said groove,
   said seal having a bottom structure comprising said bottom wall and lateral extensions at each side of said bottom wall,
   said lateral extensions having an overall width greater than the width of said groove and being deflected upward and inward upon insertion of said seal into said groove,
   said bottom structure securing said seal in said groove by frictionally gripping its opposed side walls whether said seal is inflated or deflated.

2. A sealable structure according to claim 1, wherein, said lateral extensions have an overall width equal to from about 104% to about 112% of the width of said groove.

3. A sealable structure according to claim 1, wherein, lower portions of said lateral extensions are disposed at an angle, extending upward and outward from a bottom thereof.

4. A sealable structure according to claim 3, wherein, said lateral extensions are of a triangular cross sectional configuration with outwardly extending upper surface portions and upwardly and outwardly angled lower surface portions convergent with said upper surface portions.

5. A sealable structure according to claim 4, wherein, said outwardly extending upper surface portions are horizontally disposed.

6. A sealable structure according to claim 4, wherein, the side walls of said seal are recessed inwardly in a region immediately above the outwardly extending upper surface portions of said lateral extensions to accommodate an upward and inward displacement of said lateral extensions when said seal in inserted into said groove.

7. A sealable structure, with a self-retaining inflatable seal, configured and constructed for repetitive cycles of inflation and deflation and periodic removal and replacement for servicing, which comprises
   a first sealable member formed with an outer surface and a seal-receiving groove open at said outer surface,
   said groove having a predetermined depth from said outer surface and a predetermined width and having substantially parallel side walls,
   a second sealable member having a sealing surface positionable in opposed, closely spaced relation to the outer surface of said first sealable member, and
   a self-retaining, fluid-inflatable seal received in said groove, said seal having bottom and top walls and spaced apart side walls connecting said bottom and top walls,
   said side walls extending upward with outer surfaces thereof in parallel relation to the side walls of said groove, and a width between outer surfaces of its side walls, which is less than the width of said groove,
   said seal, when unpressurized, having a height which is less than a space between the bottom of said groove and the sealing surface of said second sealable member,
   said seal having a bottom structure comprising said bottom wall and lateral extensions at each side of said bottom wall projecting laterally beyond said outer side wall surfaces,
   said lateral extensions having an overall width greater than the width of said groove and having a frictional grip on opposed side walls of said groove whether said seal is inflated or deflated.

8. A sealable structure according to claim 7, wherein, said seal, when unpressurized, has a width between outer surfaces of its side walls which is about 80% to about 90% of the width of said groove.

9. A sealable structure according to claim 7, wherein, said lateral extensions have an overall width equal to from about 104% to about 112% of the width of said groove.

10. A sealable structure according to claim 9, wherein,
said lateral extensions have bottom surfaces extending upwardly and outwardly from a bottom of said seal and converging with top surfaces of said lateral extensions, and
said lateral extensions are displaced upward and inward when said seal in inserted into said groove.

11. A sealable structure according to claim 10, wherein,
the side walls of said seal are recessed inwardly in a region immediately above the outwardly extending top surfaces of said lateral extensions to accommodate the upward and inward displacement of said lateral extensions when said seal in inserted into said groove.

12. A sealable structure according to claim 7, wherein
the walls of said seal are configured such that the expansion of said seal, when pressurized, is principally vertical.

13. A self-retaining, fluid-inflatable seal configured for reception within a groove of predetermined width and predetermined height, configured and constructed for repetitive cycles of inflation and deflation and periodic removal and replacement for servicing, said seal comprising
an extruded length of elastomeric material having spaced apart top and bottom walls, opposed spaced apart side walls and a hollow interior,
said seal having a configuration such that, upon pressurization, its expansion is principally between its top and bottom walls,
a width of said seal, between outer surfaces of its side walls, being less than said predetermined groove width,
a bottom structure of said seal comprising said bottom wall and lateral extensions projecting from opposite sides of said bottom wall, said lateral extensions having an overall width greater than said predetermined groove width for frictional gripping engagement with side walls of a groove of said predetermined width,
said bottom structure serving to secure said seal in such groove of predetermined width whether said seal is inflated or deflated,
said seal being configured such that, when pressurized within designed operating pressures, its side walls will have little to no contact with side walls of a groove of said predetermined width while space between said top and bottom walls is enlarged to position said top wall for engagement with a surface to be sealed for effecting a sealing action with said surface.

14. A self-retaining seal according to claim 13, wherein
said seal, when unpressurized, has a width between outer surfaces of its side walls of about 80% to about 90% of said predetermined width.

15. A self-retaining seal according to claim 13, wherein
said lateral extensions have an overall width equal to from about 104% to about 112% of said predetermined width.

16. A self-retaining seal according to claim 13, wherein
said seal, when unpressurized, has an overall height between outer surfaces of its top and bottom walls which is less than said predetermined height.

17. A self-retaining seal according to claim 13, wherein
said lateral extensions are of a tapered configuration, with bottom walls thereof extending upward and outward and converging with top walls thereof, and
said lateral extensions are configured to be displaced upwardly and inwardly when said seal is inserted in a groove of said predetermined width.

18. A self-retaining seal according to claim 17, wherein
said side walls are recessed in regions directly above said lateral extensions.

* * * * *